United States Patent
Marks et al.

[11] 3,824,955
[45] July 23, 1974

[54] APPARATUS FOR COATING TELEVISION VIEWING TUBES

[76] Inventors: Alvin M. Marks; Mortimer M. Marks, both of 153-16 10th Ave., Whitestone, N.Y. 11357

[22] Filed: May 15, 1972

[21] Appl. No.: 253,495

[52] U.S. Cl.................. 118/500, 117/93, 118/620, 118/627
[51] Int. Cl............................................ B05c 11/14
[58] Field of Search....... 118/6, 500, 502, 503, 621, 118/627, 629, 620; 117/93

[56] References Cited
UNITED STATES PATENTS

| | | | |
|---|---|---|---|
| 2,980,338 | 4/1961 | Kozinski | 239/15 |
| 3,263,460 | 8/1966 | Kabelitz et al. | 68/253 |
| 3,373,717 | 3/1968 | Morales | 118/6 |
| 3,403,658 | 10/1968 | Damm et al. | 118/6 |
| 3,537,424 | 11/1970 | Sadler | 118/6 |
| 3,538,883 | 11/1970 | Polin | 118/6 |
| 3,552,351 | 1/1971 | Willem | 118/6 |
| 3,672,927 | 6/1972 | Spiller et al. | 117/17 |

*Primary Examiner*—Mervin Stein
*Assistant Examiner*—Leo Millstein

[57] ABSTRACT

A structure for applying a non-reflective coating to television viewing tubes is described. The structure includes a closed container in which a tube support may be positioned for receiving and rotating the tube and means for applying the coating as a solution on the viewing face. The viscosity of the coating solution and the speed of rotation are adjusted so that the coating is spread evenly over the tube face. The coating optionally contains a plurality of needle-shaped crystals which are normally oriented by the application of an electric field to the coating. A metal screen in the container acts as one terminal for the field while the aluminized layer on the phosphorescent coating within the tube acts as the other terminal. Various devices control the timing, speed of rotation, and the application of the solution.

10 Claims, 3 Drawing Figures

APPARATUS FOR COATING TELEVISION VIEWING TUBES

BACKGROUND OF THE INVENTION

The modern television viewing tube is made of glass and includes a front surface plate which reflects lights and images from objects and lamps in the viewing area. This reflectance tends to obscure the picture and detracts from the image being presented. Several attempts have been made to provide a non-reflective coating on the face of the tube. These have included the use of a thin film of a substance having a refractive index less than the glass. Also, coatings or screens of polarizing materials have been tried. None of these attempts have been successful. The non-reflective film is damaged easily and is not practical for such a large surface. The polarizing coating absorbs too much light. The present invention uses a mixture of transparent or translucent dispersed incompatible organic and/or inorganic polymers containing pigments or dyes and may incorporate microcrystalline particles which are preferably assymetric and oriented normal to the surface of the tube. Surface reflections from the tube surface are eliminated by absorbing and diffusing light rays from objects in the viewing area incident upon the coating. A device for applying the coating and for orienting the particles in the surface layer is hereinafter described.

For a better understanding of the present invention, together with other details and features thereof, reference is made to the following description taken in connection with the accompanying drawings.

DESCRIPTION OF THE PREFERRED EMBODIMENT

Figure 1:
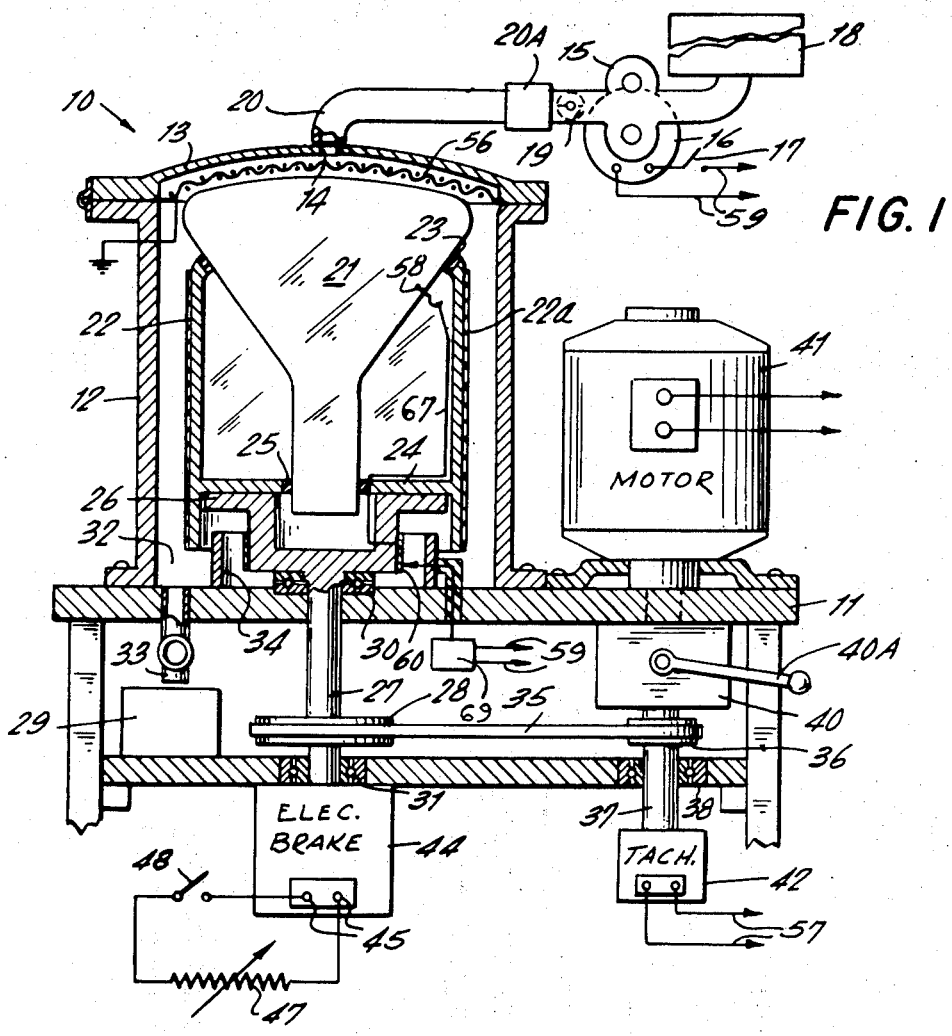
FIG. 1 is a cross sectional view of the coating apparatus showing a tube in the coating container together with the motor drives and an electric brake.
Figure 2:
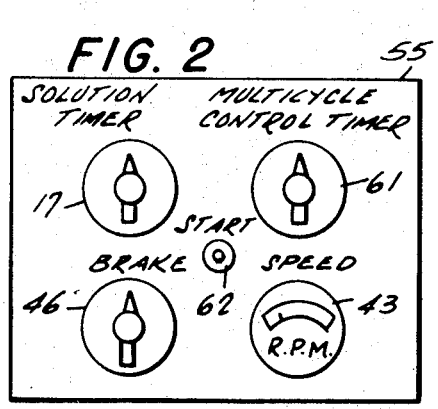
FIG. 2 is a view of the switchboard which controls the coating application and the orientation of the particles.

Referring now to FIG. 1, the tube coating apparatus 10 is mounted on a base 11 and is provided with a cylindrical housing 12. A hinged cover 13 is carried by the housing. When the cover is closed the housing 12 is substantially air-tight. At the center of the cover 13 a hole 14 is provided for the application of a coating solution. A swingable spout 20 is disposed above the hole 14 and is connected to a gear pump 15. The pump 15 is run by a motor 16 connected to a source of electric power. The motor 16 is connected in series with a preset timer 17 (FIG. 2). The gear pump 15 is also connected to a tank 18 which holds the solution. In order to cut off the solution without any dripping, a valve 19 is mounted on the output end of the pump 16. The spout 20 is journaled at 20a so that it can be swung away from the hole 14.

A television viewing tube 21 (see FIG. 1) is shown within the coating apparatus 10 and is mounted on a cradle 22. The cradle 22 is open at one end to receive the tube 21. A flexible pad 23 is provided at its upper edge for supporting the top portion of the tube 21. A flat washer-like disc 24 is secured to the lower portion of the cradle 22 and extends inwardly to hold the neck of the tube 21 in axial alignment. A flexible washer 25 within a central opening of the disc 24 engages the lower end of the tube 21. The cradle 22 is removable and when put into the housing 12 rests on a rotable table 26. The table 26 is secured to a shaft 27 turned by a pulley 28. The shaft 27 of the rotatable means may be journaled within a thrust bearing 30 but any other type of bearing may be used. The lower end of shaft 27 is mounted on a roller bearing 31.

It will be seen in FIG. 1, that the lower portion of the cradle 22 supports a skirt 22a which extends down below the table 26. This skirt which may be made of metal or Mylar sheet has been provided to convey any excess solution into the annular space 32 below the skirt, and to minimize air turbulence within the housing 12. When the coating solution reaches the bottom of the housing 12 it drops into the annular space 32 and eventually may be drawn off through a conduit 33 and collected in a container 29. To shield the bearing 30 from the excess solution, a protective cylinder 34 is added therearound. This cylinder restricts the flow of solution and makes cleaning less difficult.

Pulley 28 is driven by a belt 35 which is coupled to a smaller pulley 36 secured to a drive shaft 37. This shaft turns in a lower bearing 38 and is coupled to the output shaft of a variable speed drive 40 which in turn is connected to an electric motor 41. The speed transmitted by drive 40 may be controlled by lever 40a. The electric motor 41 may be positioned above the main base 11 as shown in FIG. 1 or it may be mounted at any other convenient place and coupled to the speed drive 40 by any appropriate means. At the lower end of shaft 37 an electric tachometer 42 is mounted for measuring the speed of shaft 37. The conductors from the tachometer are connected to a voltmeter 43 mounted on the switchboard 55. This voltmeter may be calibrated to indicate the speed of shaft 37 or the speed of shaft 27.

The tube 21 and its supporting cradle 22 are in axial alignment with shaft 27 and since both these units are supported by ball bearings they tend to turn at an uncontrolled rate after the power has been turned off. The same is true of shaft 37 and the related mechanism. It has been found important to slow the tube 21 at a regulated rate as soon as the solution on its upper surface has been evenly distributed. For this reason an electric brake 44 has been added to the bottom portion of shaft 27 for supplying a load to the moving mechanism. The electric brake may take many forms. It may be a friction device having one or more friction pads pressing on a disk with the friction pads controlled by a solenoid. Another form comprises a generator having a rotor made up of a plurality of permanent magnets. The stator includes a plurality of coils connected in series and connected to a pair of output terminals 45. Terminals 45 are connected in series with a brake timer mechanism 46 (see FIG. 2) and a varible resistor 47. As soon as the brake timer closes switch 48, a considerable drag is placed on the shaft 27 to slow it down. The amount of the drag is proportional to the value of resistor 47.

The operation of this device is as follows: the tube 21 is placed in its mounting cradle 22 and the cradle placed on table 26. Then the cradl is spun at a slow rate upon the bearing 30, generally about 25 revolutions per minute. With the tube turning the solutin timer 17 is set and the gear pump 16 is started. The end of the spout 20 is swung into register with the hole 14 and a measured amount of solution is rapidly applied to the viewing surface of tube 21 (about 2 seconds). When the solution timer opens the circuit to the gear pump, the spout 20 is swung away from the hole 14 to cut off any dripping that otherwise might occur. The tube 21, the cradle 22, and shaft 27 are then spun at a much higher speed, generally about 240 RPM for about 5 seconds. This action spreads the solution evenly over the viewing surface and any excess will flow over the edge of the viewing surface and down on the outside of skirt 22a and the inside of housing 12. After the initial rotation, the electric brake 44 is activated and the tube 21 brought to a stop within about 2 seconds. The solution is now partly dried.

While the solution is a viscous condition, an electric field is generated at right angles to the tube surfaces in order to orient all of the crystals within the solution and cause them to assume a regular pattern with respect to the surface of the tube. This is done by raising the metal cover portion 13, grounding the screen member 56 and applying a high direct current potential (either positive or negative) to the aluminized film 50 deposited on the phosphor 51 on the inside of the tube (see FIG. 3). During the time the electric field is applied, dry nitrogen or carbondioxide may be piped into the housing 10 to reduce the hazard of sparking. The screen 56 permits drying while orientation is taking place. The current is applied to the tube by means of lead 67 which is connected to the tube terminal 58. A source of potential 69 is connected to the lead 67 by means of slip ring 60 in the well-known manner.

Figure 3:
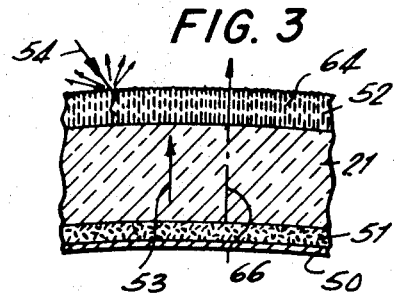
FIG. 3 is a cross sectional view to an enlarged scale of a portion of the viewing face of the tube indicating the manner in which reflectance is avoided.

The solution is made up of transparent or translucent incompatible organic or inorganic polymers, a solvent for the polymer, and a large number of microcyrstalline particles, as more fully described in our copending application entitled Nonglare Coatings For Surfaces of TV Tubes And The Like, Ser. No. 11,261. These particles may be selected from one or more asymmetric hard crystalline materials, such as silicon carbide, aluminum oxide, tungsten carbide and the like. The incorporated particles 64 may be transparent, colored or dark. In an electrical field they tend to assume a regular pattern due to mutual repulsion. Where the particles are flat, or rod shaped, they also become oriented normal to the major surface of the coating as shown in FIG. 3. The electric field is preferably alternating, for example of the order of 50 KV-rms/cm at 10 Kc.

One form of particles employed in the present coating are preferably alpha silicon carbide whiskers which have a length not exceeding a few microns and thickness not exceeding about 0.2 microns.

Alternatively, silicon carbide platelets may be used broken from larger silicon carbide crystals, as by crushing and by separation techniques known to the art. These silicon carbide particles are irregular platelets usually of somewhat hexagonal shape.

The electric field indicated by arrow 53 is maintained until the coating layer 52 (see FIG. 3) is dry to the touch. The field is then removed, the screen 56 is opened and the tube 21, together with its mounting cradle 22 is placed in a dust free atmosphere for about 15 minutes. After this preliminary drying period the tube coating is baked at a temperature which may vary from 60° to 150° centrigrade.

FIG. 3 is a cross sectional view of the viewing surface of the tube 21, greatly enlarged to show th details of the viewing end of the tube. The aluminum layer 50 comprises the innermost layer of the structure and is penetrated by the electron stream from an electron gun (not shown) to produce the picture in the well known manner. The phosphor layer 51 is deposited on the inner glass surface and delivers light for the picture whenever activated by the electron beam. The applied coating 52 is from 0.3 to 0.5. mil thick and is on the outside surface or viewing face of the tube. It contains microscopic crystalline particles made up of the substances described above.

It will be seen that as a result of the coating 52, light generated in phosphor layer 51 moving in the direction indicated by arrow 66 will traverse the applied layer 52 without too much absorption. However, light coming from lamps and objects in the room striking the outer surface of layer 52 in direction indicated by arrow 54 will be absorbed or diffused by the incompatible polymeric mixture, the irregular surface of the coating, the sides of the embedded crystals and the dyes in the polymer and will not emerge from the surface of layer 52 so as to be seen by the spectators.

Control board 55 indicates one arrangement of the multi-cycle control timer 61 is used in the operation of coating the tube surface. The timer 62 includes the usual switch contacts which are opened at the end of the timed interval, these include the solution timer switch 17 connected to leads 59 which supply power to the pump motor 16; the brake timer switch 46 is connected to the electric brake 45 in series with resistor 47 and includes switch 48. Leads 57 from the tachometer 42 are connected to voltmeter 43 which is calibrated in revolutions per minute. The timer 61 returns to zero after each cycle ready to activate the operation on the next tube. The cycle is initiated by the push button 62.

Having thus fully described the invention, what is calimed as new and desired to be secured by Letters Patent of the United States, is:

1. An apparatus for forming a substantially uniform coating upon the viewing surface of a television tube comprising: a housing for enclosing the tube during the application of the coating, a cradle rotatably carried within the housing for supporting the tube in vertical alignment, means for rotating the cradle around the tube longitudinal axis for uniformly spreading said coating on the viewing surface of the tube, said means including an electric motor coupled to the tube cradle and braking means coupled to the tube cradle for stopping the rotation of the tube after a predetermined period of time, means for injecting a fluid coating solution through the housing onto the tube viewing surface and said injecting means including a container conduit connected to the container and a spout on said conduit positioned in axial alignment with the longitudinal axis of the tube.

2. An apparatus in accordance with claim 1 wherein said tube cradle is removable from the container and is normally carried by a rotatable table journaled in a horizontal base.

3. An apparatus in accordance with claim 1 wherein said electric motor is coupled to the tube support through a speed changing device.

4. An apparatus in accordance with claim 1 wherein said cradle is rotated at a speed of the order of 150 RPM.

5. An apparatus in accordance with claim 1, wherein said coating is an anti-reflection coating including a polymer and a liquid solvent for said polymer.

6. An apparatus in accordance with claim 5, wherein said polymer is a transparent polymer.

7. An apparatus in accordance with claim 6, wherein said fluid includes a plurality of incompatible polymers.

8. A structure according to claim 1 in which the fluid includes a plurality of microcrystalline particles and means for applying an electric field substantially perpendicular to the viewing surface of the tube to move the said particles into orientation with respect to each other.

9. A structure as claimed in claim 8, wherein said means for applying an electric field to the solution includes an electrically conducting screen adjacent to the viewing surface of the tube as one electrode and an aluminum layer on the phosphor inside the tube as the other electrode, and an alternating voltage source connected across the two electrodes.

10. A structure according to claim 8 in which the electric field is alternating at about 10 Kc and 50 KV-rms/cm.

* * * * *